Figure 8:
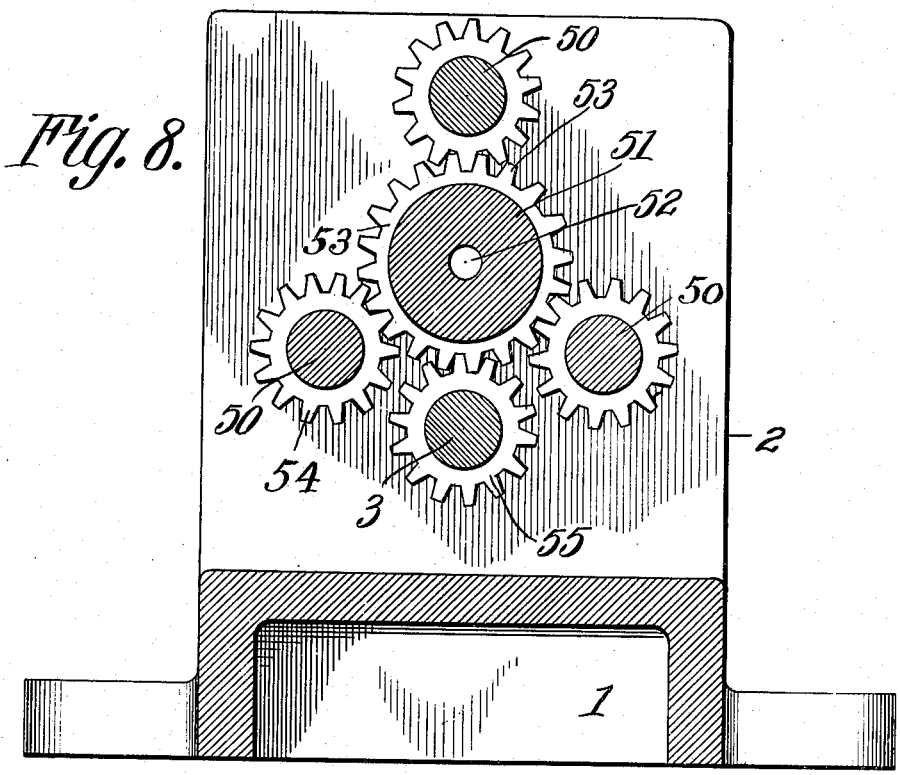

G. B. SMITH.
WIRE WORKING MACHINE.
APPLICATION FILED FEB. 11, 1908.
921,016.
Patented May 11, 1909.
6 SHEETS—SHEET 1.
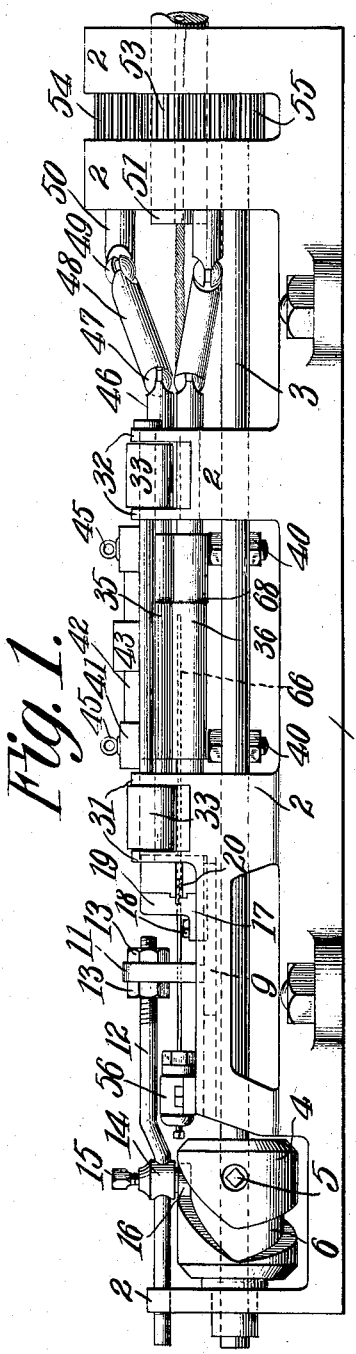
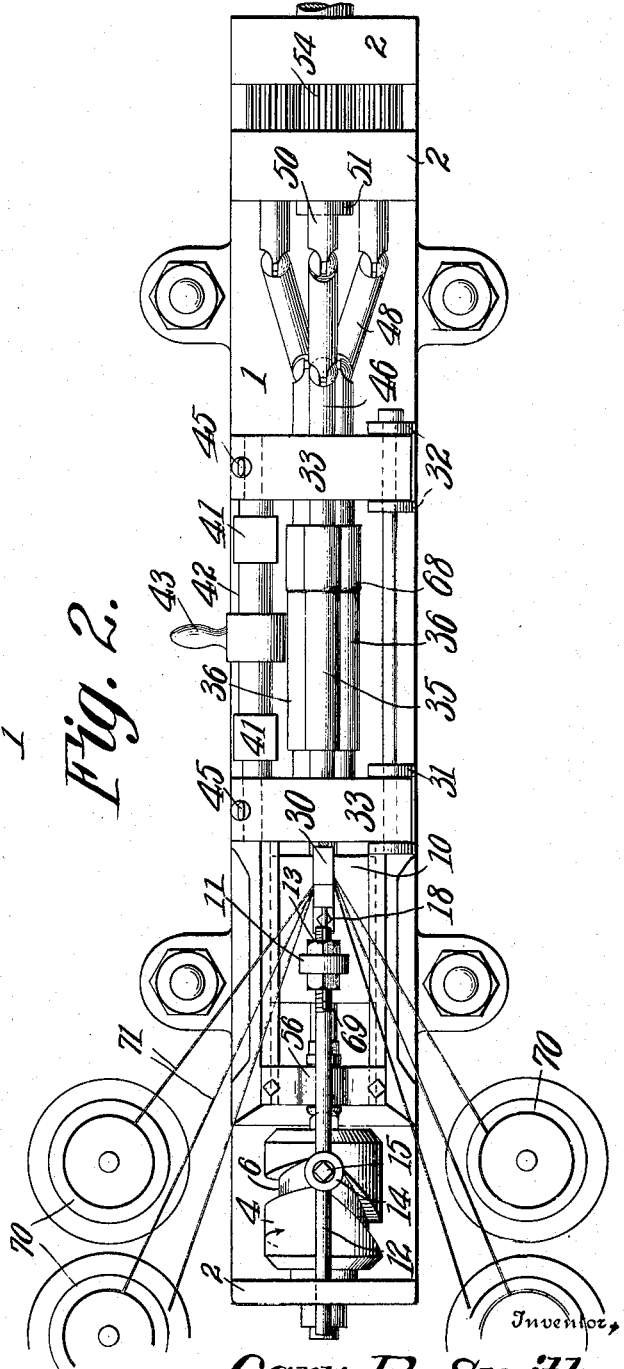
Witnesses
Inventor,
Gary B. Smith.
By C. A. Snow & Co.
Attorneys.

G. B. SMITH.
WIRE WORKING MACHINE.
APPLICATION FILED FEB. 11, 1908.
921,016.
Patented May 11, 1909.
6 SHEETS—SHEET 2.
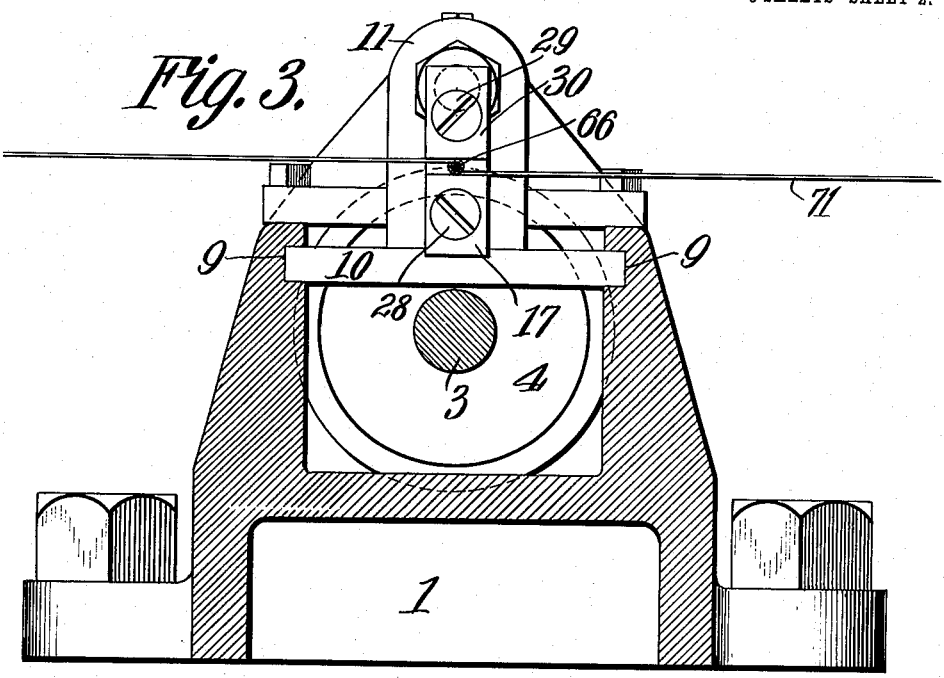
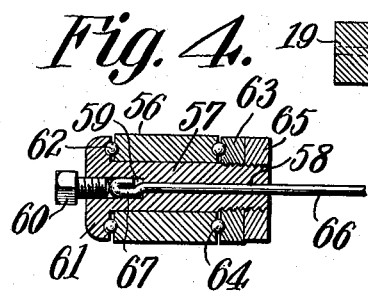
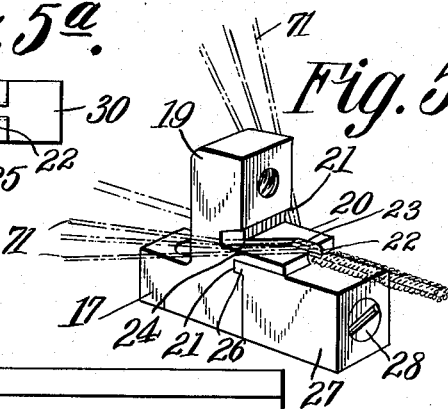
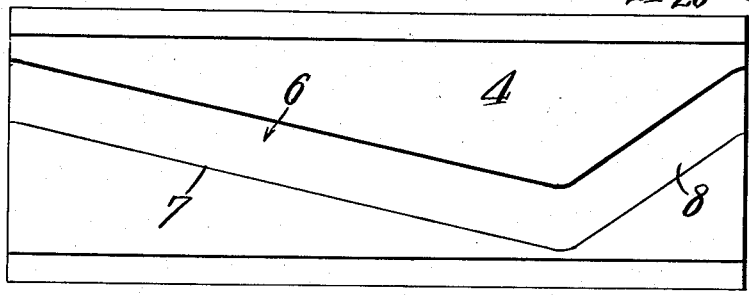
Witnesses
Inventor,
Gary B. Smith.
By C. A. Snow & Co.
Attorneys.

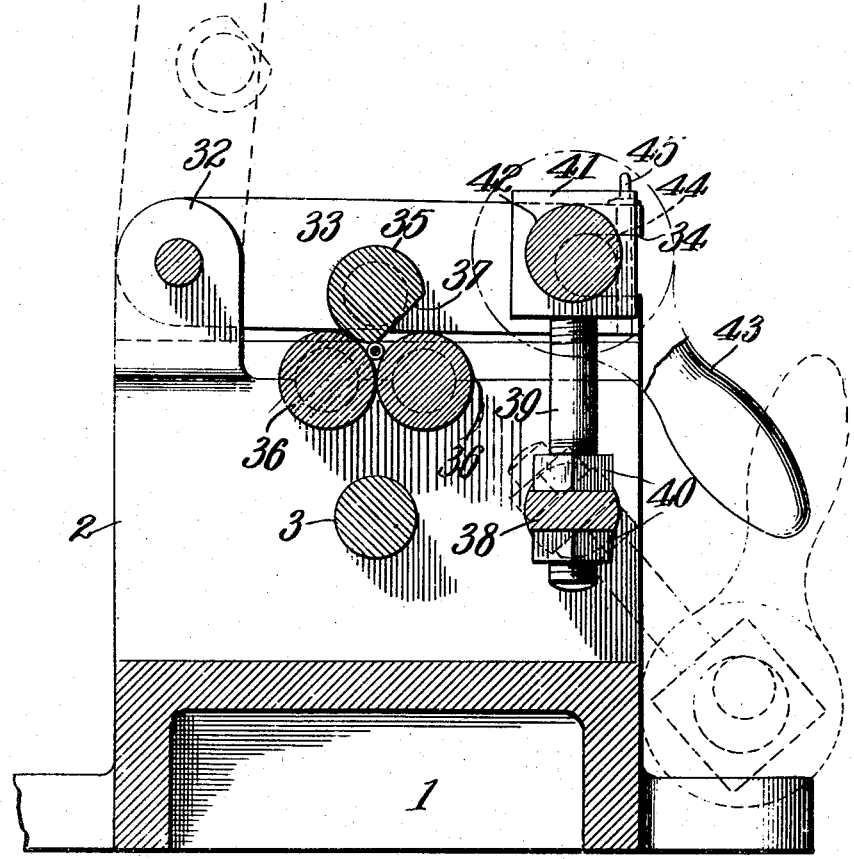

G. B. SMITH.
WIRE WORKING MACHINE.
APPLICATION FILED FEB. 11, 1908.

921,016.

Patented May 11, 1909.
6 SHEETS—SHEET 4.

Inventor,
Gary B. Smith.

G. B. SMITH.
WIRE WORKING MACHINE.
APPLICATION FILED FEB. 11, 1908.
921,016.
Patented May 11, 1909.
6 SHEETS—SHEET 5.
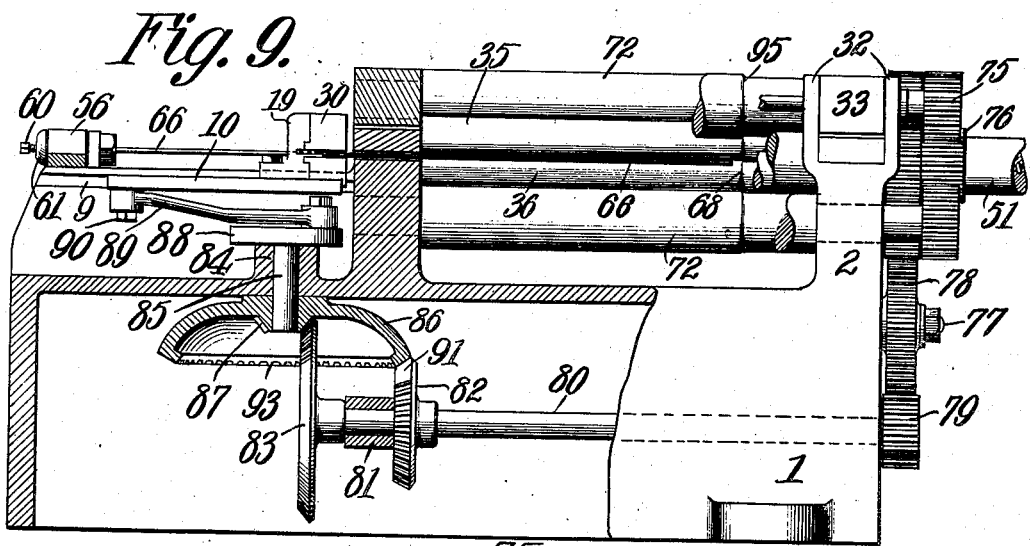
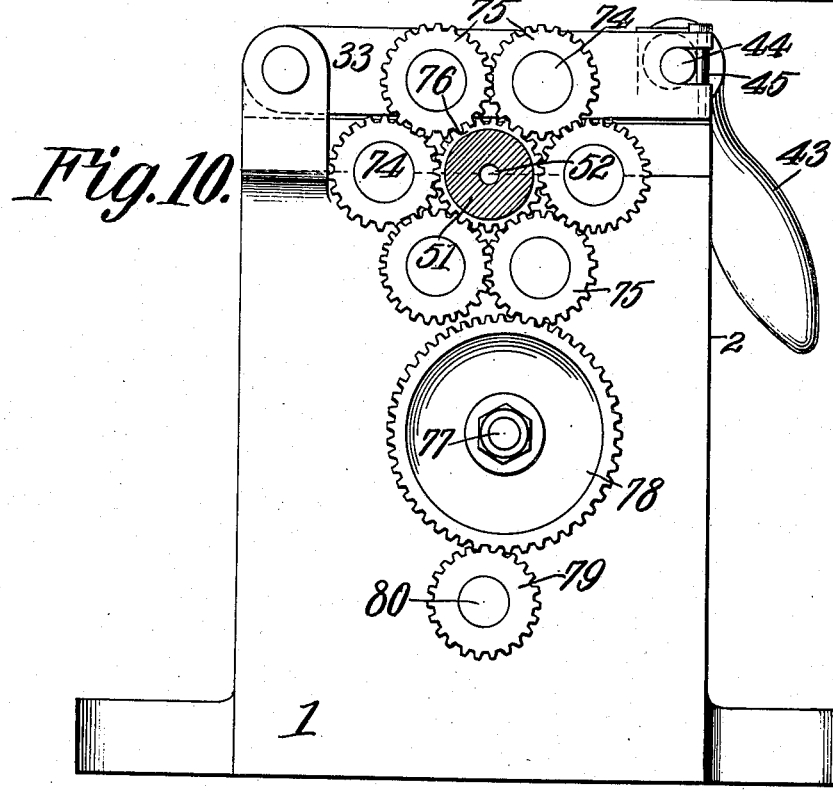
Witnesses
Inventor,
Gary B. Smith.
By C. A. Snow & Co.
Attorneys G. B. SMITH.
WIRE WORKING MACHINE.
APPLICATION FILED FEB. 11, 1908.
921,016.
Patented May 11, 1909.
6 SHEETS—SHEET 6.
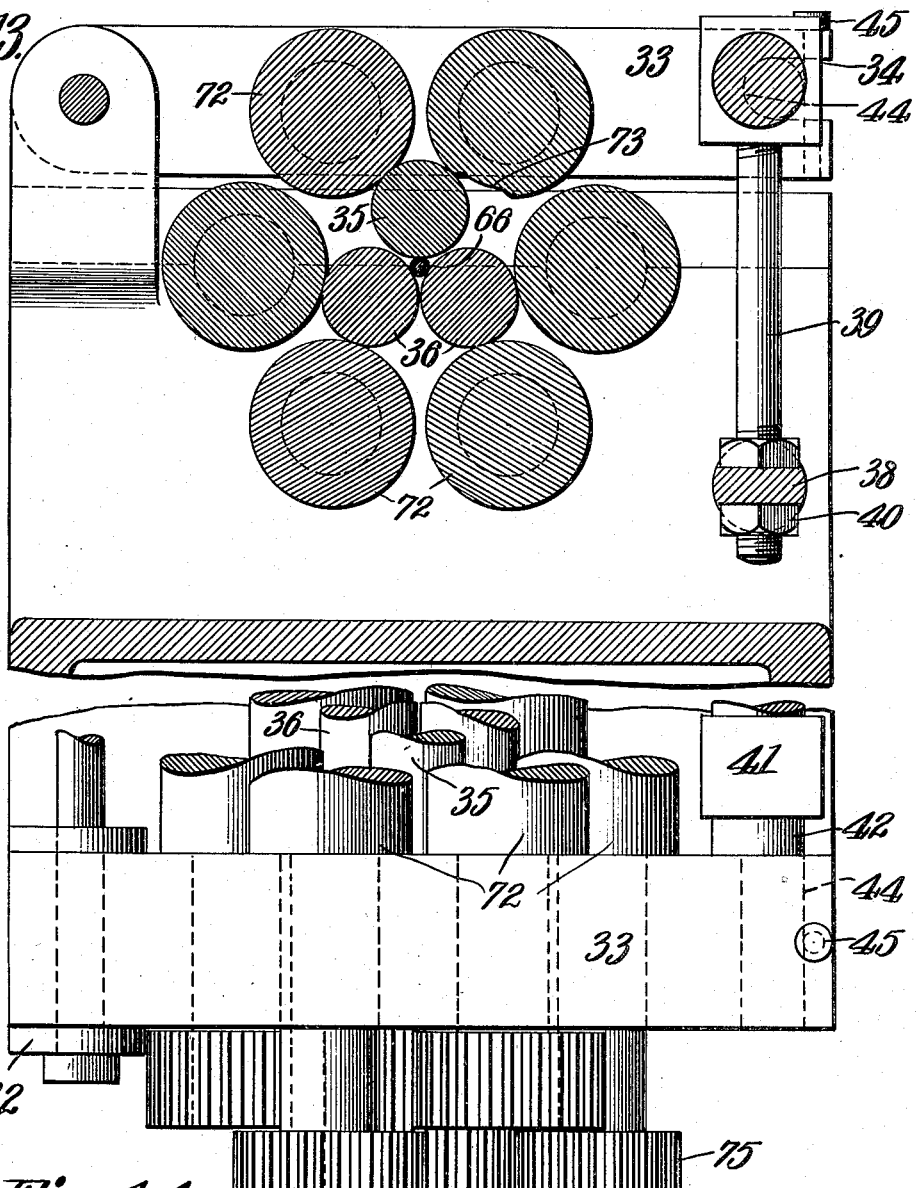
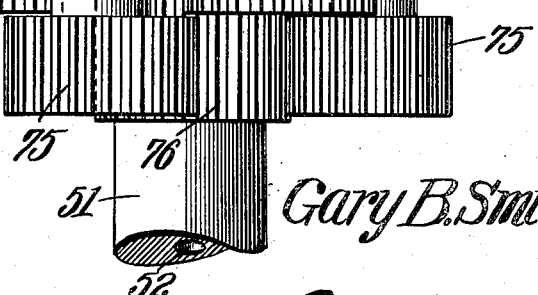

UNITED STATES PATENT OFFICE.

GARY B. SMITH, OF ANOKA, MINNESOTA.

WIRE-WORKING MACHINE.

No. 921,016.  Specification of Letters Patent.  Patented May 11, 1909.

Application filed February 11, 1908. Serial No. 415,408.

*To all whom it may concern:*

Be it known that I, GARY B. SMITH, a citizen of the United States, residing at Anoka, in the county of Anoka and State of Minnesota, have invented a new and useful Wire-Working Machine, of which the following is a specification.

This invention has reference to improvements in wire working machines, and its object is to provide a machine for the production of a twisted wire rope or cable made up of a number of individual strands laid side by side and formed into helices.

The invention consists primarily in a twisting mechanism with a coacting feeding mechanism so related and actuated that the feeding and guiding mechanism retreats from the twisting mechanism while the twisting of the strands into the rope or cable is progressing and then the twisting mechanism releases the completed portion of the rope or cable upon which it has acted while the feeding mechanism becomes active to advance the finished portion of the rope or cable out of the twisting zone. This series of operations is performed automatically so long as power is applied to the machine and the supply of wire holds out.

In accordance with the present invention there is provided a reciprocating guiding member movable longitudinally upon a suitable mandrel, which latter is capable of rotative movement, and this guiding member receives the desired number of wire strands coming from suitable sources of supply and directs them to and around the mandrel. After leaving the guide member the wire strands are grasped by a twisting mechanism which tends to form the strands and the helices about the mandrel. The guide member is moved slowly in one direction along the mandrel while the wire is being formed into helices by the twisting mechanism, and this direction is away from the twisting mechanism. The speed of movement of the guide member in the direction away from the twisting mechanism determines the degree of twist imparted to the wire. When the guide member has reached the limit of its retrograde movement the mechanism is so timed in operation that the twisting elements release the already twisted portion of the rope or cable and the guide member is advanced toward the twisting mechanism at a comparatively high speed to move the already freshly twisted rope or cable out of the twisting zone. As soon as the forward movement of the guide member has been completed the twisting mechanism again grasps the wire strands and proceeds to rotate them upon the mandrel as the guide member recedes at a comparatively slow speed from the said twisting mechanism.

The present invention comprises various mechanisms for accomplishing these several operations. The structure of these mechanisms as well as their operation will be best understood from a consideration of the following detail description taken in connection with the accompanying drawings forming a part of this specification, in which drawings—

Figure 11:
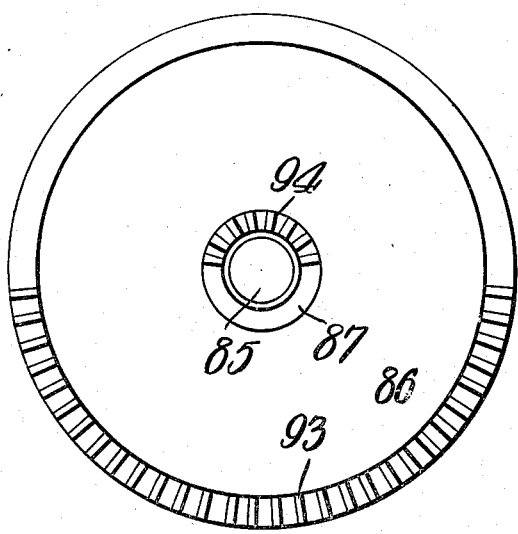
Figure 12:
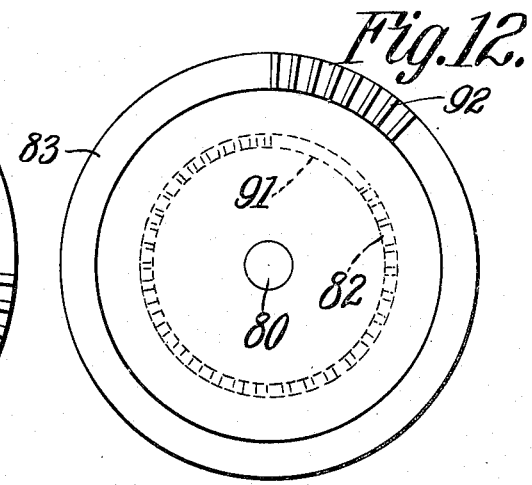

Figure 1 is a side elevation of the machine. Fig. 2 is a plan view thereof. Fig. 3 is a cross section taken in front of the guide member. Fig. 4 is a detail section through the butt ends of the mandrel and the parts supporting the same. Fig. 5 is a perspective view of a portion of the guide member. Fig. 5$^a$ is a detail view of the underside of a portion of the structure shown in Fig. 5. Fig. 6 is a displayed view of the actuating cam. Fig. 7 is a cross section through the machine at a point cutting the twisting mechanism. Fig. 8 is a cross section through the machine at the end remote from the cutter and showing the intermeshing gear for driving the twisting rolls. Fig. 9 is a detail view of a modified form of actuating mechanism replacing the cam structure. Fig. 10 is an elevation with parts in section of the right hand end of the structure shown in Fig. 9. Figs. 11 and 12 are detail views of the gearing used in conjunction with the structure shown in Fig. 9. Fig. 13 is a section through the twisting mechanism of the structure shown in Figs. 9 and 10, and Fig. 14 is a plan view of the gear at the right hand end of the structure of Fig. 9.

Referring to the drawings, there is shown a bed plate 1 upon which are cast standards 2 at such points as are necessary for the support of the several parts of the mechanism. Extending longitudinally through the standards and appropriately journaled where needed therein, is a drive shaft 3 to which power may be applied in any appropriate manner. At one end the drive-shaft carries a cam 4 fixed to the shaft in proper position by means of a set screw 5, and this cam has a circumferential groove 6 appropriately shaped for the actuation of certain mechanism to be described. By reference to Fig. 6, it will be seen that this groove has a long gentle slope through the greater portion of its length, as shown at 7, and for the remainder of the length a return portion 8 of much greater pitch. The purpose of the cam groove and its shape will appear farther on.

The bed-plate 1, near the cam is formed with elevated guideways 9 in which there slides a carriage 10 shown in the drawings as of general rectangular shape. This carriage 10 has fast or formed thereon an upright ear 11 through which there extends a rod 12 threaded at its point of passage through the ear and receiving on its threaded end two nuts 13, one on each side of the ear, and serving to clamp the rod to the ear in different positions of adjustment, the pitch of which is determined by the length of the threaded portion. The other end of this rod is extended through one of the uprights 2 and is guided thereby. At a point between the ear 11 and the upright 2 through which the rod extends, there is secured to the rod a block 14 by means of a set screw 15, so that the relation of the block to the rod may be fixed at will. The lower end of this block carries a roller 16 adapted to the cam groove 6. When the cam 4 is rotated a reciprocatory movement is imparted to the carriage 10 and the relative speed and time of reciprocation is determined by the shape of the groove 6. In the particular construction shown the movement of the carriage toward the cam is progressive for about three quarters of a revolution of the cam and the return movement is effected by one quarter of the revolution of the cam. This is taken as simply illustrative and may be varied as desired.

Fast on the carriage near the end remote from the cam is a guiding mechanism composed of a block 17 secured centrally on the carriage, and for the sake of rigidity may be slightly inset in an appropriate manner in the upper face of the carriage. This block is held in place by a screw or bolt 18, and about midway of its length is formed with an upward projection 19 the face of which is coincident with the front end of the block. Extending horizontally from this front face is a lip 20 above and below which the block is laterally recessed, as shown at 21. Extending longitudinally through the lip 20 and the portion 19 of the block 17 is a bore 22 countersunk at the free end of the lip for a distance, as indicated at 23. Extending diagonally from the counterbore to one side of the lip close to the corresponding recess 21 above the lip is a groove 24, and there is a similar groove 25 on the under side of the lip extending in the opposite direction. Underriding the lip 20 and provided with a tongue 26 entering the recess 21 under the lip, is a block 27 made fast to the block 17 by a screw 28 or otherwise. Secured to the projection 19 by a screw 29 is another block 30 overriding the lip 20 and projecting horizontally to a point coincident with the free end of the block 27 leaving a space between the underside of the block 30 and the upper face of the block 27.

At the end of the guide frame 9 remote from the cam 4 on one side of the guideways, is a pair of upwardly-projecting ears 31, and on one of the posts or uprights 2 spaced at a distance from the end of the frame 9 carrying the ears 31 are other ears 32. Between each pair of ears 31 and 32 is pivoted one end of an arm 33, there being two such arms, and the free ends of these arms are slotted, as shown at 34. About midway of the length of the arms 33 are formed journal bearings for a roller 35, and in the upper portion of the standards 2 carrying the ears 31 and 32 are formed journal bearings for two rollers 36—36, the journal bearings for the rollers 35 and 36 including an equilateral triangle with the bearings at the angles, and with the bearings of the two rollers 36 included in the base of the triangle. The roller 35 is flattened on one side, as indicated at 37, for a purpose which will presently appear.

Journaled in the posts or standards 2 which carry the arms 33 is a rock-shaft 38 flattened at appropriate points and bored near each end to receive rods 39, which are threaded where they pass through the shaft 38 and there receive nuts 40 on each side of the shaft bearing against the flattened portion. Each rod 39 has fast at its other end a block 41 in which is formed a bearing for a rock-shaft 42 carrying a manipulating handle 43 and having at the ends projecting pins 44 eccentric to the axis of the shaft. These pins are of such size as to readily enter the slots 34 and on the turning of the shaft 42 by the handle 43 the pins 44 will move into the slots and cause the arms 33 to be drawn downward and carry the roller 35 toward the rollers 36, and any structure lodged between these rollers will be subjected to such pressure as may be determined by the position of the handle 43. Each arm 33 at the outer free end is provided with perforations for the passage of a pin 45 acting as a lock for the eccentric extensions 44 of the rock-shaft 42 when introduced into the slots 34. The journals of the rollers 35 and 36 are extended beyond the post or standard 2 remote from the cam end of the machine, as indicated at 46, and these journaled extensions are connected by universal joints 47 to one end of links 48, the other ends of which are connected by universal joints 49 to corresponding shafts 50 journaled in two posts 2 at the end of the machine remote from the cam 4. The shafts 50 are spaced apart and equidistantly disposed about another shaft 51 provided with an axial passage 52 and in turn journaled in the end posts 2. Because of the introduction of the shaft 51 the other shafts 50 are spaced apart to a greater extent than are the rollers 35 and 36 and their journals. Consequently, the links 48 are divergent to connect to the shafts 50. Upon the shaft 51 is a gear wheel 53 meshing with a pinion 54 upon each shaft 50, and also with a pinion 55 upon the shaft 3.

The shaft 51 may be extended to a sufficient extent beyond the standard 2, at the corresponding end of the machine, to receive a drive pulley by means of which power is applied to the structure. However, the drive pulley is not shown and the capability of the shaft 51 for the reception of the drive pulley is indicated in the drawings by this shaft being broken away. Assuming that power is applied to the shaft 51 in the proper direction, then rotative movement is imparted to the shafts 50 and ultimately to the rollers 35 and 36, at the same time the shaft 3 receives rotative movement through the pinion 55, and this movement is imparted to the cam 4, it being understood that the several gears are properly proportioned to cause the rotative movements of the shafts in the proper timed relation.

Mounted upon the guideways or supports 9 adjacent to the cam 4 is a sleeve 56 through which there is passed a cylindrical block 57 having a central bore 58 enlarged at one end, as shown at 59, and there threaded for the reception of a set screw 60. The block 57 at its enlarged end is expanded into a head 61 of approximately the size of the end of the sleeve 56, and the meeting faces of this head and sleeve are formed with ball races for the reception of a circular series of anti-friction balls 62. The other end of the block 57 is threaded for the reception of a nut 63 which, as well as the corresponding end of the sleeve 56 is formed with a ball race for the reception of a series of anti-friction balls 64. The nut 63 co-acting with the head 61 serves to maintain the block 57 within the collar 56, while the anti-friction balls act as journal bearings for the block and permit its rotation with practically no friction. The threaded end of the block 57 also receives a lock-nut 65 to prevent the accidental displacement of the nut 63. The block 57 receives the butt end of a mandrel 66 through the bore 58 and this end of the mandrel has a small portion of its length returned on itself, as indicated at 67, and this returned end is seated in the enlarged portion 59 of the bore 58 and is there held by the set screw 60. The mandrel 66 is of such length as to extend through the reciprocating feed member and also through the space inclosed by the rollers 35 and 36 up to a point where the diameters of these rollers is enlarged, as indicated at 68.

In order that the rod 12 connecting the carriage 10 to the block 14 engaged by the cam 4 may be held against turning on the longitudinal axis, it may be provided with a keyway 69 at the threaded end engaged by the nuts 13, and after these nuts are screwed to the desired position, a key may be inserted in the keyway and engage appropriate keyways in the nuts and ear 11 to lock the parts altogether against accidental displacement.

On each side of the machine at appropriate points are arranged holders 70 for the wire, the strands of which are indicated at 71. The wire strands are carried to the respective grooves 24 and 25 and thence through the counterbore 23 and around the mandrel 66, about which latter the strands are wound in regular order. Assuming that six wire strands are used, then each strand is wound in a helix, the turns of which are separated by a distance equal to the thickness of five strands, and these helices are all interwound one with the other, as is evident. The wound strands are ultimately carried to the rollers 35 and 36. Now let it be assumed that under these conditions the machine is operating. The reciprocating feed block is moved by the cam toward the latter at the same time that the rollers 35 and 36 are rotated in a direction to wind the wire strands about the mandrel, the latter rotating with these strands because it is free to do so since the block 57 is readily rotatable in the sleeve 56, the said rollers engaging the wire strands with a pressure depending upon the position of the handle 43. The result is that the strands are twisted into a helix about the mandrel as the feed block retreats, and the wires are drawn through the grooves 24 and 25 and are directed thereby to the mandrel and about the same. This movement is a comparatively slow one so that there may be time to twist the wire strands about the mandrel. The movement of the block 10 being completed, the direction of movement of the said block is reversed by the portion 8 of the cam groove, and this portion being much steeper than the rest of the cam groove, actuates the block 10 toward the rollers 35 and 36 at a comparatively high speed in order that the already twisted wire strands may be moved forward so that the rollers can again grip the strands near the termination of the twist. To permit the quick forward movement of the already twisted strands is the purpose of the cut away portion 37 of the roller 35, and the rotation of the roller 35 is so timed that this cut away portion is brought into coincidence with the twisted strands and remains in coincidence with these twisted strands during the forward movement of the feeding block. When the block 10 has reached the limit of its forward movement, then the roller 35 has rotated such a distance as is necessary to bring its circular periphery again into engagement with the twisted strands and so cause them to be gripped by the three rollers, and thus wrapped about the mandrel. At the same time the block 10 again retreats under the action of the long member 7 of the cam groove and additional wire is fed around the mandrel and is twisted into the helical shape by the action of the rolls 35 and 36. When the twisted wire has passed off the mandrel it is brought into coincidence with the enlarged portions 68 of the rollers 35 and 36, and consequently this portion of the helices is subjected to a compressing action by the rolls, whereby its diameter is decreased and the tendency of the helices to expand after leaving the mandrel and after being relieved from the pressure of the rollers 35 and 36 is counteracted.

With the structure thus far described the twisting of the strands occupies about three periods of time applied to one period of time applied in the movement of the already twisted strands beyond the action of the rollers 35 and 36. There is advantage, however, in having the time relation between the twisting of the strands and the movement of the already twisted strands to bring new sections of the wire into action more disproportionate, and in Figs. 9 to 14 is illustrated a form of operating mechanism whereby the retreating movement of the block 10 to its forward movement is such that the retreating movement takes about seven times as long as the forward movement. Also the structure of these figures takes less floor space than that of the structure of Figs. 1 and 2. In this structure, the rollers 35 and 36 have no end journals, and the roller 35 has its periphery continuous instead of being provided with a flattened portion. These three rollers 35 and 36 are confined within a circular series of rollers 72, and one of these rollers engaging the roller 35 has its periphery cut away, as indicated at 73, so that for a portion of the time of its revolution, say one-eighth, it will not engage the roller 35, and the latter may move away from the wire upon the mandrel or at least so relieve the pressure thereon as not to interfere with the longitudinal movement of the wire during the forward movement of the block 10. In order to drive these several rollers 72, their shafts 74 are extended beyond the end post 2 and there carry pinions 75. Certain of the shafts 74 are journaled in the arms 33 so that the roller 35 may be brought to bear with graduated pressure upon the wire on the mandrel, or this roller may be rendered accessible so as to be elevated out of place when the machine is first put into operation to start the wire strands into the twisting rolls. These pinions 75 are arranged in two series so that the alternate pistons are in different planes, that is, considering six rollers and six pinions, three of the pinions are equidistantly spaced and are in one plane, and the alternate pinions, three in number, are equidistantly spaced and in another plane. The drive shaft 51 is suitably journaled in the end post 2 and carries a pinion 76 of sufficient length to engage all the pinions 75 and impart rotative movement thereto. The several pinions 75 are immediately adjacent to the corresponding post 2 carrying the ears 32, so that the machine is shortened by the omission of the parts of the structure of Fig. 1 beyond this particular post. Journaled upon a stud 77 projecting from the post or standard 2 under consideration, is a gear wheel 78 meshing with one of the pinions 75. This gear wheel acts simply as an idler and transmits power to the pinion 79 on one end of a shaft 80 extending through the standard 2 toward the other end of the machine and is provided with another journal bearing 81 fast on an appropriate part of the machine beneath the wire twisting structures. The shaft 80 carries two bevel pinions 82 and 83 of different diameters. Formed in the base of the machine above the portion through which the shaft 80 extends, is a hollow stud 84 forming a journal bearing for a short upright shaft 85 having its lower end extending into the space in the base below the twisting mechanism and there carrying a crown bevel gear 86 and a bevel pinion 87 central of said crown gear. At the upper end of the shaft 85 is a crank disk 88 connected by a pitman 89 to a pin 90 on the under side of the block 10. The bevel gear wheel 82 is best shown in Fig. 12 where it will be seen that this gear is a mutilated gear with the teeth omitted through a segment 91 occupying about one-eighth of the circumference of the gear. It will also be seen that the gear wheel 83 is a mutilated gear having teeth through only about one-eighth of its circumference, as indicated at 92.

The crown gear 86 and pinion 87 are best shown in Fig. 11, where it can be seen that the gear wheel 86 is a mutilated gear having teeth through one-half its circumference, as indicated at 93, while the pinion 87 is a mutilated pinion having teeth through but one-half its circumference, as indicated at 94. The blank space 91 of the gear wheel 82 is arranged in coincidence with the toothed portion 92 of the gear wheel 83, and the toothed portions 93 and 94 of the gear wheel 86 and pinion 87 are similarly arranged. When the shaft 80 is rotated the gear-wheel 82 will impart to the crown gear 86 a half rotation through a time period equal to seven-eighths of the rotation of the shaft 80 and the gear wheel 83 will impart to the pinion 87 a half rotation during the remaining one-eighth of the rotation of the shaft 80. The result of this is that the block or carriage 10 is moved slowly in one direction until its travel is completed and then quickly in the other direction through the same length of travel, thereby accomplishing the same purpose as the different members of the cam groove of the cam 4 of the structure of Fig. 1. It is to be observed that the structure of Fig. 9 and the other figures relating thereto performs the same functions as the structure of Fig. 1, and its correlating figures, while the floor space occupied by the structure of Fig. 9 is very much less than the floor space of the structure of Fig. 1. Furthermore, the structure of Fig. 9 presents the advantage of quicker return movement when the winding mechanism is inactive than does the structure of Fig. 1, while the active winding movement is prolonged in relation to the return movement. In order to provide for the enlarged portions 68 of the rollers 35 and 36, the periphery of each roll 72 is reduced, as shown at 95.

The twisted wire ropes or cables produced by the machine forming the subject-matter of this invention are particularly useful for the production of bed bottoms because the ropes or cables are compact, and strong and sufficiently elastic so as to yield under the weight of the occupant of the bed and return to their normal length when relieved from the weight. The elasticity is such that these bed bottoms replace wire spring mattresses and because of the compact nature of the ropes or cables they may be kept clean and are in fact not at all liable to accumulate dirt or other deleterious matter.

In the foregoing description it has been assumed that six strands of wire were used for the production of the twisted wire rope or cable, but it will be understood that a greater or less number may be used, as desired, and the time relation of the movement of the parts will be made to agree to the number of wire strands used. Furthermore, it is to be understood that the invention is not of necessity limited to the exact structures shown and described, but these structures may be modified in various ways and their relations may be changed so long as the principles of the invention are retained.

In order to prevent lubricating oil from reaching the working faces of the rollers 36 in the structure of Fig. 1, these rollers are reduced in diameter for a distance back from their journals, as shown. In the structures shown in Figs. 9 to 14, the lubricating oil cannot reach the rollers 35 and 36 because these rollers have no journals at all but are carried by other rollers 72.

What is claimed is:—

1. In a machine for making ropes or cables of a number of wire strands, means for twisting the strands simultaneously into interlocking helices, a guiding means movable with relation to the twisting means, and actuating means, other than the twisted strands, for the guiding means, timed in movement to determine the pitch of the helices.

2. In a machine for forming wire ropes or cables of wire strands, a means for twisting a number of wire strands into helices with their coils contacting, means other than the twisted strands, coacting with the twisting means for determining the pitch of the helices, means for rendering the twisting means inactive for a predetermined time interval, and means for moving the finished product out of the path of the twisting means during the inactive period of the latter.

3. In a machine for producing wire ropes or cables from wire strands, a twisting means for forming the wire strands simultaneously and progressively in the helices with their coils adjacent, a mandrel about which the wire strands are twisted into helices, and means coacting with the twisting means for compacting the helices after being formed.

4. In a machine for forming wire ropes or cables from a number of wire strands, a means for forming a number of strands lying side by side into helices with adjacent coils, a mandrel about which the wire strands are formed into helices, a means for guiding the wire strands to the mandrel, and means other than the twisted strands for moving the guiding member away from the twisting means at a predetermined rate of speed to determine the pitch of the turns of the helices.

5. In a machine for forming a number of wire strands into a rope or cable, a suitable mandrel, means for directing a number of strands side by side to the mandrel, a twisting means for the wire strands for forming them into helices about the mandrel, means for moving the guiding means away from the twisting means at a rate of speed and for a time period depending upon the desired pitch of the helices, means for moving the directing means toward the twisting means at a more rapid rate of speed than away therefrom, and means for rendering the twisting means inactive and for releasing the twisted strands therefrom during the said more rapid movement of the strand-directing means.

6. In a machine for twisting a number of wire strands lying side by side into a rope or cable, a mandrel for receiving the strands while being twisted, and twisting rolls engaging the strands about the mandrel and provided with sections of greater diameter beyond the end of the mandrel.

7. A machine for winding a number of wire strands into a rope or cable, comprising an interconnected series of winding rolls, a mandrel central to the rolls, a reciprocating guiding block provided with a passage for the mandrel and having an enlarged opening surrounding the mandrel with guide grooves leading to the enlarged opening, means for moving the guiding block away from the twisting rolls at a rate of speed depending upon the desired pitch of the helices of the wire strands and for moving the block toward the twisting rolls at a greater rate of speed, and means for stopping the action of the twisting rolls upon the wire strands during the movement of the guide block toward said twisting rolls.

8. In a machine for twisting a number of wire strands into interspersed helices, a mandrel, and a series of twisting rolls surrounding the mandrel and provided with sections of greater diameter beyond the end of the mandrel for compacting the twisted wires after leaving the mandrel.

9. In a machine for twisting a number of strands of wire into a rope or cable, a guide block provided with a through passage having one end enlarged, the enlarged end of the passage being formed in a projecting lip on the block, and said lip having guiding grooves leading to the enlargement of the passage in the lip, and other blocks forming a continuation of the main block and arranged both above and below the lip.

10. In a machine for making ropes or cables of a number of wire strands, means for twisting the strands simultaneously into interlocking helices, a guiding means for the wire strands, movable with relation to the twisting means, and means for moving the guiding means away from the twisting means at a rate of speed and for a time period depending upon the desired pitch of the helices and for moving the guiding means toward the twisting means at a more rapid rate of speed than away therefrom.

11. In a machine for forming a number of wire strands into a rope or cable, a mandrel about which the strands are twisted, a supporting block for the butt end of the mandrel formed at one end with a head and at the other end provided with screw-threads, a collar receiving said block, journal bearings between the block and collar, and means for holding the block to the collar.

12. In a machine for forming wire ropes or cables from a number of wire strands, a mandrel about which the strands are wound, said mandrel having one end bent upon itself, a block receiving the butt end of the mandrel and having a receptacle for the bent-over end of the mandrel, means for closing the receptacle to confine the mandrel to the block, and anti-friction bearings for the block and constituting a support for the mandrel about which the latter is free to be turned on a longitudinal axis.

13. In a machine for forming wire ropes or cables from a number of wire strands, twisting rolls for forming the strands into helices, and means for locking the rolls to the strand with desired pressure comprising arms pivoted at one end and a latch mechanism for the other ends of the arms comprising a rockshaft movable about pivotal supports to and from the arms, and eccentric pins carried by the rock-shaft and movable into engagement with the arms to elevate or depress the latter.

14. In a machine for forming wire ropes or cables from a number of wire strands, a twisting means for the strands, a guiding means for the strands movable to and from the twisting means, and means for moving the guiding means away from the twisting means during a longer time interval than is occupied by the return movement of the guiding means toward the twisting means.

15. In a machine for forming wire ropes or cables from a number of wire strands, a twisting means for the strands, a guiding means for the strands movable to and from the twisting means, and positive connections between the power side of the machine and said guiding means for actuating said guiding means in both directions irrespective of the twisted strands.

16. In a machine for forming wire ropes or cables from a number of wire strands, a twisting means for the strands, a guiding means for the strands movable to and from the twisting means, and positive connections between the power side of the machine and said guiding means, timed to move the guiding means toward the twisting means with greater speed than away therefrom.

17. In a machine for forming wire ropes or cables from a number of wire strands, a twisting means for the strands, a guiding block for the strands movable to and from the twisting means, and means for positively actuating the guiding means in each direction comprising a rotatable shaft, crank and pitman connections between said shaft and guiding block, and mutilated gear connections between the power side of the machine and said shaft, timed to impart to said shaft different speeds of rotation during different periods of rotative movement.

18. In a machine for forming wire ropes or cables from wire strands, a twisting means for the strands comprising a circular series of rolls, means for rotating said rolls continuously, and means for relieving the strands from the active engagement of the rolls at predetermined intervals.

In testimony that I claim the foregoing as my own, I have hereto affixed my signature in the presence of two witnesses.

GARY B. SMITH.

Witnesses:
HATTIE C. SMITH,
J. H. NILES.